(12) United States Patent
Scales et al.

(10) Patent No.: US 9,297,929 B2
(45) Date of Patent: Mar. 29, 2016

(54) CONTACT LENSES COMPRISING WATER SOLUBLE N-(2 HYDROXYALKYL) (METH)ACRYLAMIDE POLYMERS OR COPOLYMERS

(71) Applicant: Johnson & Johnson Vision Care, Inc., Jacksonville, FL (US)

(72) Inventors: Charles W. Scales, St. Augustine, FL (US); Kevin P. McCabe, St. Augustine, FL (US); Brent Matthew Healy, Jacksonville Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/899,676

(22) Filed: May 22, 2013

(65) Prior Publication Data

US 2013/0317132 A1    Nov. 28, 2013

Related U.S. Application Data

(60) Provisional application No. 61/651,767, filed on May 25, 2012, provisional application No. 61/771,959, filed on Mar. 4, 2013.

(51) Int. Cl.
*G02B 1/04* (2006.01)

(52) U.S. Cl.
CPC ..................... *G02B 1/043* (2013.01)

(58) Field of Classification Search
None
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 3,808,178 A | 4/1974 | Gaylord | |
| 4,018,853 A | 4/1977 | Le Boeuf et al. | |
| 4,113,224 A | 9/1978 | Clark et al. | |
| 4,120,570 A | 10/1978 | Gaylord | |
| 4,136,250 A | 1/1979 | Mueller et al. | |
| 4,139,513 A | 2/1979 | Tanaka et al. | |
| 4,153,641 A | 5/1979 | Deichert et al. | |
| 4,168,112 A | 9/1979 | Ellis et al. | |
| 4,190,277 A | 2/1980 | England | |
| 4,197,266 A | 4/1980 | Clark et al. | |
| 4,287,175 A | 9/1981 | Katz | |
| 4,321,261 A | 3/1982 | Ellis et al. | |
| 4,436,730 A | 3/1984 | Ellis et al. | |
| 4,495,313 A | 1/1985 | Larsen | |
| 4,557,264 A | 12/1985 | Hinsch | |
| 4,663,409 A | 5/1987 | Friends et al. | |
| 4,680,336 A | 7/1987 | Larsen et al. | |
| 4,740,533 A | 4/1988 | Su et al. | |
| 4,889,664 A | 12/1989 | Kindt-Larsen et al. | |
| 4,910,277 A | 3/1990 | Bambury et al. | |
| 5,006,622 A | 4/1991 | Kunzler et al. | |
| 5,034,461 A | 7/1991 | Lai et al. | |
| 5,039,459 A | 8/1991 | Kindt-Larsen et al. | |
| 5,070,215 A | 12/1991 | Bambury et al. | |
| 5,177,165 A | 1/1993 | Valint, Jr. et al. | |
| 5,219,965 A | 6/1993 | Valint, Jr. et al. | |
| 5,244,981 A | 9/1993 | Seidner et al. | |
| 5,256,751 A | 10/1993 | Vanderlaan | |
| 5,260,000 A | 11/1993 | Nandu et al. | |
| 5,311,223 A | 5/1994 | Vanderlaan | |
| 5,314,960 A | 5/1994 | Spinelli et al. | |
| 5,319,589 A | 6/1994 | Yamagata et al. | |
| 5,321,108 A | 6/1994 | Kunzler et al. | |
| 5,331,067 A | 7/1994 | Seidner et al. | |
| 5,371,147 A | 12/1994 | Spinelli et al. | |
| 5,385,996 A | 1/1995 | Rizzardo et al. | |
| 5,387,662 A | 2/1995 | Kunzler et al. | |
| 5,451,617 A | 9/1995 | Lai et al. | |
| 5,525,691 A | 6/1996 | Valint, Jr. et al. | |
| 5,539,016 A | 7/1996 | Kunzler et al. | |
| 5,700,559 A | 12/1997 | Sheu et al. | |
| 5,723,255 A | 3/1998 | Texter et al. | |
| 5,760,100 A | 6/1998 | Nicolson et al. | |
| 5,805,264 A | 9/1998 | Janssen et al. | |
| 5,874,511 A | 2/1999 | Rizzardo et al. | |
| 5,942,558 A | 8/1999 | Korb | |
| 5,944,853 A | 8/1999 | Molock et al. | |
| 5,962,548 A | 10/1999 | Vanderlaan et al. | |
| 5,998,498 A | 12/1999 | Vanderlaan et al. | |
| 6,020,445 A | 2/2000 | Vanderlaan et al. | |
| 6,087,412 A | 7/2000 | Chabrecek et al. | |
| 6,087,415 A | 7/2000 | Vanderlaan et al. | |
| 6,099,852 A | 8/2000 | Jen | |
| 6,277,365 B1 | 8/2001 | Ellis et al. | |
| 6,367,929 B1 * | 4/2002 | Maiden et al. | 351/159.33 |
| 6,428,839 B1 | 8/2002 | Kunzler et al. | |

(Continued)

FOREIGN PATENT DOCUMENTS

| CN | 10166334 A | 3/2010 |
|---|---|---|
| DE | 4143239 A1 | 7/1993 |

(Continued)

OTHER PUBLICATIONS

PCT International Search Report, dated Oct. 29, 2013, for PCT Int'l Appln. No. PCT/US2013/042644.
PCT International Preliminary Report on Patentability, dated Nov. 25, 2014, for PCT Int'l Appln. No. PCT/US2013/042628.
PCT International Preliminary Report on Patentability, dated Nov. 25, 2014, for PCT Int'l Appln. No. PCT/US2013/042644.
Babmann-Schnitzler et al, Sorption properties of hydrophobically modified poly(acrylic acids) as natural organic matter model substances to pyrene, Colloids and Surfaces A: Physiocochem. Eng. Aspects 260 (2005) 119-128.

(Continued)

*Primary Examiner* — Peter A Salamon
(74) *Attorney, Agent, or Firm* — Karen A. Harding

(57) ABSTRACT

The present invention relates to biomedical devices, and particularly contact lenses comprising a polymer having entangled therein at least one polymer comprising repeating units from N-(2-hydroxyalkyl)(meth)acrylamide.

26 Claims, No Drawings

(56) References Cited

U.S. PATENT DOCUMENTS

| | | | |
|---|---|---|---|
| 6,433,061 | B1 | 8/2002 | Marchant et al. |
| 6,458,142 | B1 | 10/2002 | Faller et al. |
| 6,637,929 | B2 | 10/2003 | Baron |
| 6,794,486 | B2 | 9/2004 | Adam et al. |
| 6,822,016 | B2 | 11/2004 | McCabe et al. |
| 6,858,310 | B2 | 2/2005 | McGee et al. |
| 6,867,245 | B2 | 3/2005 | Iwata et al. |
| 7,109,276 | B2 | 9/2006 | Wilczewska et al. |
| 7,553,880 | B2 | 6/2009 | Nicolson et al. |
| 7,566,746 | B2 | 7/2009 | Winterton et al. |
| 7,592,341 | B2 | 9/2009 | Tomich et al. |
| 7,705,067 | B2 | 4/2010 | Winterton et al. |
| 7,807,755 | B2 | 10/2010 | Farnham et al. |
| 7,816,454 | B2 | 10/2010 | Higashira et al. |
| 7,816,464 | B2 | 10/2010 | Farcet |
| 8,158,695 | B2 | 4/2012 | Vanderlaan et al. |
| 8,273,366 | B2 | 9/2012 | Chauhan et al. |
| 8,337,551 | B2 | 12/2012 | Linhardt et al. |
| 2002/0016383 | A1 | 2/2002 | Iwata et al. |
| 2003/0125498 | A1 | 7/2003 | McCabe et al. |
| 2003/0162862 | A1 | 8/2003 | McCabe et al. |
| 2004/0116310 | A1 | 6/2004 | Kunzler |
| 2004/0208983 | A1 | 10/2004 | Hill et al. |
| 2005/0031793 | A1 | 2/2005 | Moeller et al. |
| 2005/0192610 | A1 | 9/2005 | Houser et al. |
| 2006/0063852 | A1 | 3/2006 | Iwata et al. |
| 2006/0072069 | A1* | 4/2006 | Laredo et al. ............ 351/160 H |
| 2006/0187410 | A1 | 8/2006 | Sato et al. |
| 2007/0116740 | A1 | 5/2007 | Valint, Jr. et al. |
| 2007/0122540 | A1 | 5/2007 | Salamone |
| 2007/0155851 | A1 | 7/2007 | Alli et al. |
| 2007/0232783 | A1 | 10/2007 | Moad et al. |
| 2008/0045612 | A1* | 2/2008 | Rathore et al. ................ 516/102 |
| 2008/0143957 | A1 | 6/2008 | Linhardt et al. |
| 2008/0151236 | A1 | 6/2008 | Prince et al. |
| 2008/0174035 | A1 | 7/2008 | Winterton |
| 2008/0307751 | A1 | 12/2008 | Newman et al. |
| 2008/0314767 | A1 | 12/2008 | Lai et al. |
| 2009/0029043 | A1 | 1/2009 | Rong et al. |
| 2009/0108479 | A1 | 4/2009 | Lai et al. |
| 2009/0141236 | A1 | 6/2009 | Chen et al. |
| 2009/0142292 | A1 | 6/2009 | Blackwell et al. |
| 2009/0168012 | A1 | 7/2009 | Linhardt et al. |
| 2009/0169716 | A1 | 7/2009 | Linhardt et al. |
| 2009/0171049 | A1 | 7/2009 | Linhardt et al. |
| 2009/0171459 | A1 | 7/2009 | Linhardt et al. |
| 2009/0173044 | A1 | 7/2009 | Linhardt et al. |
| 2009/0176676 | A1 | 7/2009 | Hilvert et al. |
| 2009/0186229 | A1 | 7/2009 | Muller et al. |
| 2010/0048847 | A1 | 2/2010 | Broad |
| 2010/0069522 | A1 | 3/2010 | Linhardt et al. |
| 2010/0099829 | A1 | 4/2010 | Parakka |
| 2010/0137548 | A1 | 6/2010 | Moad et al. |
| 2010/0162661 | A1 | 7/2010 | Vanderbilt et al. |
| 2010/0168852 | A1 | 7/2010 | Vanderbilt et al. |
| 2010/0168855 | A1 | 7/2010 | McGee et al. |
| 2010/0249356 | A1 | 9/2010 | Rathore |
| 2010/0296049 | A1 | 11/2010 | Justynska et al. |
| 2010/0298446 | A1 | 11/2010 | Chang et al. |
| 2010/0315588 | A1 | 12/2010 | Nunez et al. |
| 2010/0317809 | A1 | 12/2010 | Linhardt et al. |
| 2010/0317816 | A1 | 12/2010 | Linhardt et al. |
| 2010/0317817 | A1 | 12/2010 | Linhardt et al. |
| 2010/0318185 | A1 | 12/2010 | Nunez et al. |
| 2011/0102736 | A1 | 5/2011 | Wu et al. |
| 2011/0112267 | A1 | 5/2011 | Jakubowski et al. |
| 2011/0189291 | A1 | 8/2011 | Yang et al. |
| 2011/0230589 | A1* | 9/2011 | Maggio et al. ................ 523/107 |
| 2011/0237766 | A1 | 9/2011 | Maggio et al. |
| 2011/0275734 | A1 | 11/2011 | Scales et al. |
| 2011/0293522 | A1 | 12/2011 | Wang et al. |
| 2012/0026457 | A1 | 2/2012 | Qiu et al. |
| 2012/0109613 | A1 | 5/2012 | Boyden et al. |
| 2013/0217620 | A1 | 8/2013 | Alli et al. |

FOREIGN PATENT DOCUMENTS

| | | |
|---|---|---|
| DE | 4337492 C2 | 6/1999 |
| EP | 0080539 B1 | 6/1983 |
| EP | 1803754 A2 | 7/2007 |
| JP | 10512000 | 11/1998 |
| RU | 2008131301 | 2/2010 |
| WO | 9631792 A1 | 10/1996 |
| WO | 9729788 A1 | 8/1997 |
| WO | 0171392 A1 | 9/2001 |
| WO | 03022321 A2 | 3/2003 |
| WO | 03022322 A2 | 3/2003 |
| WO | WO 2004040337 A1 | 5/2004 |
| WO | 2004056909 A1 | 7/2004 |
| WO | 2007070653 A2 | 6/2007 |
| WO | 2008061992 A2 | 5/2008 |
| WO | 2008112874 A1 | 9/2008 |
| WO | 2008124093 A1 | 10/2008 |
| WO | 2009085754 A1 | 7/2009 |
| WO | 2009085755 A1 | 7/2009 |
| WO | 2009085759 A1 | 7/2009 |
| WO | 2009089207 A1 | 7/2009 |
| WO | 2009117374 A1 | 9/2009 |
| WO | 2010039653 A1 | 4/2010 |
| WO | 2011071791 A1 | 6/2011 |
| WO | 2011140318 A1 | 11/2011 |

OTHER PUBLICATIONS

Bannister, et al, "Development of Branching in Living Radical Copolymerization of Vinyl and Divinyl Monomers", Macromolecules 2006, vol. 39, pp. 7483-7492.

Burchard, "Particle Scattering Factors of Some Branched Polymers", Macromolecules 1977, vol. 10, No. 5, pp. 919-927.

Burchard, "Solution Properties of Branched Macromolecules", Advances in Polymer Science, 1999, vol. 143, pp. 113-194.

Burchard, et al, "Information on Polydispersity and Branching from Combined Quasi-Elastic and Integrated Scattering", Macromolecules 1980, vol. 13, pp. 1265-1272.

Crivello, et al, Photoinitiators for Free Radical Cationic & Anionic Photopolymerisation, 2nd Edition, vol. III, pp. 275-298, John Wiley and Sons, New York, 1998.

Encyclopedia of Polymer Science and Engineering, N-Vinyl Amide Polymers, Second edition, vol. 17, pp. 198-257, John Wiley & Sons Inc. 1989.

Gao, et al, "Synthesis of functional polymers with controlled architecture by CRP of monomers in the presence of cross-linkers: From stars to gels", Progress in Polymer Science 2009, vol. 34, pp. 317-350.

Huan et al: "Synthesis and Properties of Polydimethylsiloxane-Containing Block Copolymers via Living Radical Polymerization", Journal of Polymer Science: Part A: Polymer Chemistry, vol. 39, 2001, pp. 1833-1842.

ISO 18369-4:2006: Ophthalmic optics—Contact lenses—Part 4: Physicochemical properties of contact lens materials.

ISO 9913-1: 1996(E).

Karunakaran et al, Synthesis, Characterization, and Crosslinking of Methacrylate-Telechelic PDMAAm-b-PDMS-b-PDMAAm Copolymers, Journal of Polymer Science: Part A: Polymer Chemistry, vol. 45, 4284-4290 (2007), Wiley Periodicals, Inc.

Lowe et al: "Reversible addition-fragmentation chain transfer (RAFT) radical polymerization and the synthesis of water-soluble (co)polymers under homogeneous conditions in organic and aqueous media", Prog. Polym. Sci. 32 (2007) 283-351.

McDowall et al: "Synthesis of Seven-Arm Poly(vinyl pyrrolidone) Star Polymers with Lysozyme Core Prepared by MADIX/RAFT Polymerization", Macromolecular Rapid Communication, vol. 29, 2008, pp. 1666-1671.

Mosmann, Rapid Colorimetric Assay for Cellular Growth and Survival: Application to Proliferation and Cytotoxicity Assays, Journal of Immunological Methods, 65 (1983) 55-63.

Pavlovic et al: "Synthesis and characterization of hydrophilic silicone copolymers and macromonomers for opthalmic application", Database accession No. 2008:955522; & Abstracts of Papers, 236th

(56) References Cited

OTHER PUBLICATIONS

ACS National Meeting, philadelphia, PA, US, Aug. 17-21, 2008, POLY-113 Publisher: American Chemical Society, Washington, DC 2008.
PCT International Preliminary Report on Patentability, dated Nov. 5, 2013, for PCT Int'l Appln. No. PCT/US2012/035722.
PCT International Preliminary Report on Patentability, dated Nov. 15, 2012, for PCT Int'l Appln. No. PCT/US2011/035324.
PCT International Search Report, dated Mar. 6, 2014, for PCT Int'l Appln. No. PCT/US2013/040066.
PCT International Search Report, dated Feb. 26, 2014, for PCT Int'l Appln. No. PCT/US2013/042628.
PCT International Search Report, dated May 27, 2014, for PCT Int'l Appln. No. PCT/US2013/042658.
PCT International Search Report, dated Aug. 11, 2011, for PCT Int'l Appln. No. PCT/US2011/035324.
PCT International Search Report, dated Jul. 11, 2012, for PCT Int'l Appln. No. PCT/US2012/035722.
Shedge et al, Hydrophobically Modified Poly(acrylic acid) Using 3-Pentadecycicyclohexylamine: Synthesis and Rheology, Macromolecular Chemistry and Physics 2005, 206, 464-472.
Sugiyama, et al, "Evaluation of biocompatibility of the surface of polyethylene films modified with various water soluble polymers using Ar plasma-post polymerization technique", Macromolecular Materials and Engineering, (2000), 282, 5-12.
Vo, et al, "RAFT Synthesis of Branched Aacrylic Copolymers", Macromolecules 2007, vol. 40, pp. 7119-7125.
Vogt, et al, "Tuning the Temperature Response of Branched Poly(N-isopropylacrylamide) Prepared by RAFT Polymerization", Macromolecules 2008, vol. 41, pp. 7368-7373.
Wooley, et al, A 'Branched-Monomer Approach' for the Rapid Synthesis of Dendimers, Angew. Chem. Int. Ed. Engl. 1994, vol. 33, No. 1, pp. 82-85.
PCT International Preliminary Report on Patentability, dated Nov. 25, 2014, for PCT Int'l Appln. No. PCT/US2013/042658.
PCT International Preliminary Report on Patentability, dated Nov. 25, 2014, for PCT/US2013/040066.

\* cited by examiner ized into or onto hydrophobic substrates, including silicone hydrogel contact lenses. However, the hydrophobic blocks require special polymerization steps and can decrease the hydrophilicity of the hydrophilic polymer.

Therefore it would be advantageous to find additional high molecular weight hydrophilic polymers which may be incorporated into a lens formulation to improve wettability of the lens without a surface treatment.

CONTACT LENSES COMPRISING WATER SOLUBLE N-(2 HYDROXYALKYL) (METH)ACRYLAMIDE POLYMERS OR COPOLYMERS

RELATED APPLICATIONS

This application claims priority to U.S. Provisional Patent Application No. 61/651,767, filed on May 25, 2012, entitled "POLYMERS AND NANOGEL MATERIALS AND METHODS FOR MAKING AND USING THE SAME"; U.S. patent application Ser. No. 13/840,919, filed on Mar. 15, 2013, entitled "POLYMERS AND NANOGEL MATERIALS AND METHODS FOR MAKING AND USING THE SAME"; and U.S. Provisional Patent Application No. 61/771,959, filed on Mar. 4, 2013, entitled "CONTACT LENSES COMPRISING WATER SOLUBLE N-(2 HYDROXYALKYL)(METH)ACRYLAMIDE POLYMERS OR COPOLYMERS"; the contents of which are incorporated by reference.

BACKGROUND OF THE INVENTION

Contact lenses have been used commercially to improve vision since at least the 1950s. The first contact lenses were made of hard materials and as such were somewhat uncomfortable to users. Modern soft contact lenses are made of softer materials, typically hydrogels. Many wearers still wear soft contact lenses formed from hydrogels.

Recently soft contact lenses made from silicone hydrogels have been introduced. Silicone hydrogel are water-swollen polymer networks that have improved oxygen permeability. These lenses provide a good level of comfort to many lens wearers, but there are some users who experience discomfort and excessive ocular deposits leading to reduced visual acuity when using these lenses. This discomfort and deposits has been attributed to the hydrophobic character of the surfaces of lenses and the interaction of those surfaces with the protein, lipids and mucin and the hydrophilic surface of the eye.

Others have tried to improve comfort and reduce deposits on contact lenses by incorporating at least one polymeric wetting agent into either or both of the contact lens matrix or packaging solution.

Cyclic polyamides, such as polyvinylpyrollidone and acyclic polyamides, have been incorporated into both conventional and silicone containing hydrogel formulations and contact lenses. Poly(meth)acrylamide and N-substituted poly (meth)acrylamides have been disclosed to be hydrophilic IPN agents which may be incorporated into conventional (non-silicone containing) hydrogels.

Modifying the surface of a polymeric article by adding polymerizable surfactants to a monomer mix used to form the article has also been disclosed. However, lasting in vivo improvements in wettability and reductions in surface deposits are not likely.

Polyvinylpyrrolidone (PVP) have been added to hydrogel forming compositions to form a semi-interpenetrating network which shows a low degree of surface friction, a low dehydration rate and a high degree of biodeposit resistance. High molecular weight hydrophilic polymers, such as PVP have been added as internal wetting agents into silicone hydrogel lenses, however such polymers can be difficult to solubilize in reaction mixtures which contain silicones.

Block copolymers having hydrophobic blocks and hydrophilic block have also been disclosed as suitable for incorporating into or onto hydrophobic substrates, including silicone hydrogel contact lenses. However, the hydrophobic blocks require special polymerization steps and can decrease the hydrophilicity of the hydrophilic polymer.

SUMMARY OF THE INVENTION

The present invention relates to medical devices, and specifically ophthalmic devices comprising, consisting and consisting essentially of a cross-linked polymer matrix and at least one water soluble, non-reactive hydrophilic polymer comprising less than 20 mol % anionic repeating units and repeating units derived from N-(2-hydroxyalkyl)(meth)acrylamide of Formula I

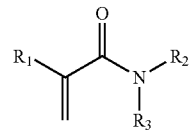

Wherein $R^1$ is hydrogen or methyl, $R^2$ is H or a $C_{1-4}$ alkyl substituted with at least one hydroxyl group; and $R^3$ is 2 a $C_{1-4}$ alkyl substituted with at least one hydroxyl group; wherein said water soluble, non-reactive hydrophilic polymer has a degree of polymerization of about 100 to about 100,000 and is free of terminal, hydrophobic polymer blocks.

The present invention further relates to a method comprising, consisting and consisting essentially of contacting a biomedical device formed from a hydrogel with a solution comprising at least one water soluble, non-reactive hydrophilic polymer comprising less than 20 mol % anionic repeating units and repeating units derived from N-(2-hydroxyalkyl) (meth)acrylamide of Formula I

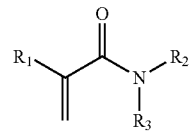

Wherein $R^1$ is hydrogen or methyl, $R^2$ is H or a C1-4 alkyl substituted with at least one hydroxyl group; and $R^3$ is 2 a C1-4 alkyl substituted with at least one hydroxyl group; wherein said water soluble, non-reactive hydrophilic polymer has a degree of polymerization of about 100 to about 100,000 and is free of terminal, hydrophobic polymer blocks under conditions sufficient to incorporate a lubricious effective amount of said non-reactive hydrophilic polymer in said biomedical device.

The present invention further relates to an ophthalmic solution comprising, consisting and consisting essentially of between about 10 ppm and about 10 wt % at least one water soluble, non-reactive hydrophilic polymer comprising less than 20 mol % anionic repeating units and repeating units derived from N-(2-hydroxyalkyl)(meth)acrylamide of Formula I

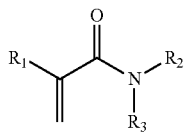

Wherein $R^1$ is hydrogen or methyl, $R^2$ is H or a $C_{1-4}$ alkyl substituted with at least one hydroxyl group; and $R^3$ is 2 a $C_{1-4}$ alkyl substituted with at least one hydroxyl group; wherein said water soluble, non-reactive hydrophilic polymer has a degree of polymerization of about 100 to about 100,000 and is free of terminal, hydrophobic polymer blocks.

DETAILED DESCRIPTION OF THE INVENTION

As used herein "associated" means that the hydrophilic polymer is retained in the at least partially hydrophobic polymer without covalent bonding.

As used herein "non-reactive" means the polymer lacks functional groups which form covalent bonds under reaction, storage and use conditions. For example, when the hydrophilic polymer is added to a reactive mixture, which is polymerized via free radical polymerization, the hydrophilic polymer chains do not contain free radical reactive groups. Thus, the hydrophilic polymer is incapable of forming covalent bonds with the substrate. When the hydrophilic polymer is contacted with a substrate such as a contact lens before autoclaving, very few (less than 1 wt %) of the hydrophilic polymer chains contain residual reactive groups. Even if residual groups were present, the contacting conditions lack the initiators necessary to catalyze free radical reactions. Thus, the hydrophilic polymer is incapable of forming covalent bonds with the substrate. The vastly predominating effect keeping the wetting agent associated with the polymer is association and entrapment of at least a portion of the hydrophilic polymer. The hydrophilic polymer or polymer segment is "entrapped", according to this specification, when it is physically retained within the polymer matrix. This is done via entanglement within the polymer matrix, van der Waals forces, dipole-dipole interactions, electrostatic attraction, hydrogen bonding and combinations of these effects.

As used herein "polymer" includes both homo- and copolymers.

As used herein "at least partially hydrophobic polymer matrices" are those which comprise repeating units derived from hydrophobic components such as hydrophobic monomers, macromers and prepolymers. Hydrophobic components are those which are not soluble in water, and which when polymerized have contact angles greater than about 90°. Examples of at least partially hydrophobic polymer matrices include contact lenses formed from PMMA, silicones, silicone hydrogels (both coated and uncoated), stents, catheters and the like. Examples of hydrophobic monomers, macromers and prepolymers are known and include monomers, macromers and prepolymers containing silicone groups, siloxane groups, unsubstituted alkyl groups, aryl groups and the like. Non-limiting examples of hydrophobic components include silicone containing monomers such as TRIS, monomethacryloxypropyl terminated mono-n-butyl terminated polydimethylsiloxanes (800-1000 MW) (mPDMS), monomethacryloxypropyl terminated mono-n-methyl terminated polydimethylsiloxanes, HO-mPDMS, SiMAA, alkyl reactive components including alkyl(meth)acrylates such as methyl methacrylate, lauryl methacrylate, and (meth)acrylamides such as $C_1$-$C_{12}$ alkyl(meth)acrylate, $C_1$-$C_{12}$ alkyl(meth)acrylamides, combinations thereof, and the like.

As used herein "segment" refers to a section of polymer having repeating units with similar properties, such as composition or hydrophilicity.

As used herein, "silicone segment" refers to —[SiO]—. The Si atom in each —[SiO]-repeating unit may be alkyl or aryl substituted, are preferably substituted with $C_{1-4}$ alkyl, and in one embodiment are substituted with methyl groups to form a dimethylsiloxane repeating unit.

As used herein "associative segment" means a portion of the polymer that is retained or associated in or on a surface, region, or segment of a substrate.

A "hydrophilic associative segment" is hydrophilic, but can associate with the substrate via hydrogen, ionic bonding. For example, for substrates which comprise a proton acceptor such as DMA, poly (DMA), NVP or PVP, the hydrophilic associative segment comprises proton donating groups. Comonomers that contain suitable proton donating groups include N-hydroxyalkyl(meth)acrylamide monomers such as N-(2-hydroxypropyl)methacrylamide, N-(2,3-dihydroxypropyl)methacrylamide; 4-acrylamidobutanoic acid (ACAII), or vinyl bezoic acid. Covalent bonds are not formed between the hydrophilic associative segment and the substrate. It is a benefit of the present invention that the N-hydroxyalkyl(meth)acrylamide polymers do not comprise separate associative segments, and particularly terminal associative segments, because the polymers are themselves capable of associating with the selected substrate. Hydrophilic monomers are those which yield a clear single phase when mixed with water at 25° C. at a concentration of 10 wt %.

The term "cross-linked" refers to the attachment of a polymer chain to one or more polymer chain(s) via a bridge or multiple bridges, composed of an element, a group or a compound, that join certain carbon atoms of the chains by primary bonds, including covalent, ionic and hydrogen bonds.

In one or more embodiments, the solutions are clear. In one embodiment the aqueous solution is at least about 50 weight % water or lens packing solution, in some embodiments at least about 70 weight %, in other embodiments at least about 90 weight %, in other embodiments least about 99 weight %, and in other embodiments least about 99.5 weight %.

The N-hydroxyalkyl(meth)acrylamide (HAMA) polymers are non-reactive and soluble in aqueous solutions, including ophthalmic solutions and compositions.

As used herein, "stable" means that the compound does not undergo a change through a single autoclaving cycle of 121° C. for 30 minutes which would deleteriously affect the desired properties of either the N-hydroxyalkyl(meth)acrylamide polymer(s) or the combination of the N-hydroxyalkyl (meth)acrylamide polymer(s) and polymer substrate. The autoclaving may be conducted dry or in the presence of an ophthalmically compatible saline solution, such as, but not limited to borate or phosphate buffered saline.

As used herein "substrate" refers to an article, such as a sheet, film, tube or more complex form such as biomedical devices.

As used herein, a "biomedical device" is any article that is designed to be used while either in or on mammalian tissues or fluid, and preferably in or on human tissue or fluids. Examples of these devices include but are not limited to catheters, implants, stents, sutures and ophthalmic devices such as intraocular lenses and contact lenses and the like. A preferred class of biomedical devices of the present invention is ophthalmic devices, particularly contact lenses, most particularly contact lenses made from silicone hydrogels.

As used herein, the term "lens" refers to ophthalmic devices that reside in or on the eye. These devices can provide optical correction, cosmetic enhancement or effect, UV blocking and visible light or glare reduction, therapeutic effect, including wound healing, delivery of drugs or nutraceuticals, diagnostic evaluation or monitoring, or any combination thereof. The term lens includes, but is not limited to, soft contact lenses, hard contact lenses, intraocular lenses, overlay lenses, ocular inserts, and optical inserts.

As used herein, a "silicone-containing polymer" is any polymer containing silicone or siloxane repeating units. The silicone-containing polymer may be a homopolymer, such as silicone elastomers, or a copolymer such as fluoro-silicones and silicone hydrogels. As used herein, silicone hydrogel refers to a polymer comprising silicone containing repeating units and a water content of at least about 10%, and in some embodiments at least about 20%.

As used herein "RAFT" refers to reversible addition fragmentation-chain transfer polymerization.

As used herein "reactive components" are the components in a polymerization reaction mixture which become part of the structure of the polymer upon polymerization. Thus, reactive components include monomers and macromers which are covalently bound into the polymer network, as well as components which do not become covalently bound to the polymer network, but are permanently or semi-permanently associated with the polymer. Examples of components which are not covalently bound include non-polymerizable wetting agents, pharmaceuticals and the like. Diluents and processing aids which do not become part of the structure of the polymer are not reactive components.

As used herein "substituted" refers to alkyl groups or aryl groups which contain halogens, esters, aryls, alkenes, alkynes, ketones, aldehydes, ethers, hydroxyls, amides, amines and combinations thereof.

As used herein "free radical source" refers to any suitable method of generating free radicals such as the thermally induced homolytic scission of a suitable compound(s) (thermal initiators such as peroxides, peroxyesters, or azo compounds), the spontaneous generation from monomer (e.g., styrene), redox initiating systems, photochemical initiating systems or high energy radiation such as electron beam, X- or gamma-radiation. Chemical species known to act as "free radical sources" are commonly called initiators by those skilled in the art and will be referred to as such for the purposes of this invention.

As used herein, the phrase "without a surface treatment" means that the exterior surfaces of the devices of the present invention are not separately treated to improve the wettability of the device. Treatments which may be foregone because of the present invention include, plasma treatments, grafting, coating and the like. However, coatings which provide properties other than improved wettability, such as, but not limited to antimicrobial coatings and the application of color or other cosmetic enhancement may be applied to devices of the present invention.

As used herein the term "silicone containing compatibilizing component" means reaction components which contain at least one silicone and at least one hydroxyl group. Such components have been disclosed in WO03/022321 and WO03/022322.

As used herein the term "bioactive linker group" means linker groups having 40 atoms or less which can be used to conjugate a bioactive agent to the hydrophilic polymer. The linker can include poly(ethylene glycol) (PEG), poly(alkylene oxide), C1-C12 short chain alkyl, C1-C12 short chain cycloalkyl, C1-C12 aryl, peptide, protein, oligomer of amino acids or combinations thereof. Bioactive linkers also include labile linkers, including a peptide sequence such as glycine-phenylalanine-leucine-glycine, as well as succinic anhydride, glutaric anhydride, dimethyl succinic anhydride, methyl glutaric anhydride, thioesters, disulfide bonds, PLA-, PLGA-, PCL-, oligomers and other ester and anhydride linkages.

As used herein the term "proton acceptor" or "proton accepting groups" means functional groups which have the ability to accept a proton under lens forming, autoclaving or storage conditions. Proton accepting groups include amines, amides, carbonyls and the like.

As used herein the term "proton donor" means functional groups which have the ability to donate a proton to a proton accepting segment or group under lens forming, autoclaving or storage conditions. Proton donating functional groups include alcohols, acids, primary amides, and the like.

The compositions of the present invention comprise, consist essentially and consist of at least one water soluble, non-reactive, hydrophilic polymer comprising repeating units derived from at least one N-hydroxyalkyl(meth)acrylamide monomer and less than 20 mol % anionic repeating units, where said water soluble, non-reactive, hydrophilic polymer has a degree of polymerization of about 100 to about 100,000 and is free of terminal, hydrophobic polymer blocks.

The N-hydroxyalkyl(meth)acrylamide polymers are formed from N-hydroxyalkyl(meth)acrylamide having the following structure:

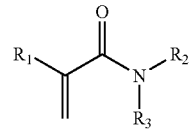

Formula I

Wherein $R^1$ is hydrogen or methyl, $R^2$ is H or a $C_{1-4}$ alkyl, which may be optionally substituted with at least one hydroxyl group; and $R^3$ is a $C_{1-4}$ alkyl substituted with at least one hydroxyl group.

Examples of $C_{1-4}$ hydroxy substituted alkyl groups include -hydroxyethyl groups, 2-hydroxypropyl groups, 3-hydroxypropyl groups, 2,3-dihydroxypropyl groups, 4-hydroxy butyl groups, 2-hydroxy-1,1-bis(hydroxymethyl)ethyl groups.

Examples of include N-(2-hydroxy propyl)(meth)acrylamide, N-(3-hydroxypropyl)(meth)acrylamide, N-(2-hydroxyethyl)(meth)acrylamide, and

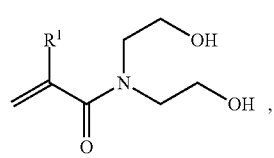

(s1)

N,N-bis(2-hydroxyethyl)acrylamide

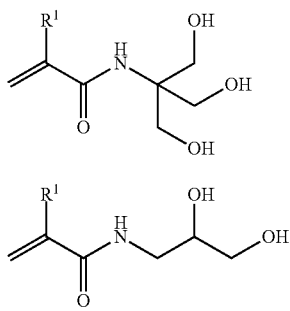

In one embodiment the N-hydroxyalkyl(meth)acrylamide polymers comprises N-(2-hydroxypropyl)(meth)acrylamide, N,N-bis(2-hydroxyethyl)acrylamide, and copolymers thereof and in another embodiment, N-(2-hydroxypropyl) methacrylamide and copolymers thereof.

The present invention further relates to ophthalmic solutions and ophthalmic devices which comprise the water soluble, non-reactive hydrophilic polymer polymers derived from at least one N-hydroxyalkyl(meth)acrylamide monomer.

The N-hydroxyalkyl(meth)acrylamide polymers which may be incorporated on or into ophthalmic devices and ophthalmic solutions of the present invention may homopolymers or copolymers, and when they are copolymers they may be random copolymers or block copolymer comprising two or more non-anionic, hydrophilic blocks. When the water soluble, non-reactive N-hydroxyalkyl(meth)acrylamide (HAMA) polymers are copolymers, they do not comprise terminal hydrophobic blocks, such as terminal alkyl blocks or silicone blocks.

The HAMA polymers of the present invention are non-reactive, meaning they do not crosslink with each other and do not form covalent bonds with the substrate polymer.

The HAMA polymers comprise at least about 10 mole % repeating units derived from HAMA, in some embodiments between about 20 and about 100 mole %, and in other embodiments between about 50 and about 100 mole %, and in other embodiments between about 70 and about 100 mole %.

The HAMA polymer may comprise comonomers selected from hydrophilic monomers, hydrophobic monomers, anionic monomers, cationic monomers, zwitterionic monomers, stimuli responsive monomers and combinations thereof, so long as the comonomers do not make the HPMA polymer water insoluble or raise the concentration of anionic comonomers above 20 mole %, 15 mole % and in some embodiments 10 mole %.

Examples of hydrophilic monomers include vinyl amides, vinyl imides, vinyl lactams, hydrophilic(meth)acrylates, (meth)acrylamides, styrenics, vinyl ethers, vinyl carbonates, vinyl carbamates, vinyl ureas and mixtures thereof.

Examples of suitable hydrophilic comonomers include N-vinyl pyrrolidone, N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, vinylimidazole, N—N-dimethylacrylamide, acrylamide, acrylonitrile, N-isopropyl acrylamide, vinyl acetate, polyethylene glycol(meth)acrylates, 2-ethyl oxazoline, 2-methacryloyloxyethyl phosphorylcholine, 3-(dimethyl(4-vinylbenzyl)ammonio)propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl) dimethylammonio)propane-1-sulfonate (APDAPS), methacryloyloxy)propyl)dimethylammonio)propane-1-sulfonate (MAPDAPS), N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, and the like, and mixtures thereof. In one embodiment the hydrophilic monomer comprises N-vinyl pyrrolidone, N-vinyl-N-methylacetamide, 2-methacryloyloxyethyl phosphorylcholine, N,N-dimethylacrylamide and the like and mixtures thereof.

In some embodiments the hydrophilic polymer may also comprise charged monomers. When the charged monomers are anionic, it may be preferred to keep the concentration of anionic monomer below 20 mole %, below 15 mole % and in some embodiments below about 5 mole %. In this embodiment, it may be preferable to form a random copolymer. This may be done by any known means, such as selecting anionic monomers which have similar kinetic reaction rates to the selected N-hydroxyalkyl(meth)acrylamide monomer, or controlling the feed rate of the monomer with the faster reaction rate such that a random copolymer is formed. This minimizes the amount of cationic preservative that is uptaken by an ophthalmic device which comprises the hydrophilic polymer of the present invention.

Suitable anionic comonomers include methacrylic acid, acrylic acid, 3-acrylamidopropionic acid, 4-acrylamidobutanoic acid, 5-acrylamidopentanoic acid, 3-acrylamido-3-methylbutanoic acid (AMBA), N-vinyloxycarbonyl-α-alanine, N-vinyloxycarbonyl-β-alanine (VINAL), 2-vinyl-4,4-dimethyl-2-oxazolin-5-one (VDMO), reactive sulfonate salts, including, sodium-2-(acrylamido)-2-methylpropane sulphonate (AMPS), 3-sulphopropyl(meth)acrylate potassium salt, 3-sulphopropyl(meth)acrylate sodium salt, bis 3-sulphopropyl itaconate di sodium, bis 3-sulphopropyl itaconate di potassium, vinyl sulphonate sodium salt, vinyl sulphonate salt, styrene sulfonate, sulfoethyl methacrylate, combinations thereof and the like. The anionic comonomers may be substantially free of or free of boronic acid containing monomers, such as vinyl phenyl boronic acid. Boronic acid monomers have been disclosed to be useful as an associative monomer. The HAMA polymer associates with the substrate via proton donation and therefore boronic acid monomers are not necessary.

In another embodiment the HAMA polymer comprises comonomers selected from zwitterionic monomers and stimuli responsive monomers.

Specific embodiments are described in more detail below.

The HAMA polymer may be linear or branched, but is not cross-linked. Linear polymers have a single polymer backbone without crosslinks or "bridges" between polymer chains and without polymer side chains pendant to the main chain. Branched polymers are those comprising multiple polymer chains radiating from a non-crosslinked core (such as star polymers or dendrimers), or from a central backbone (such as brush or comb polymers).

The N-hydroxyalkyl(meth)acrylamide polymer of this embodiment may have a single hydrophilic segment or may have multiple hydrophilic segments as described above. These polymers may be used as additives to polymeric reactive mixtures, such as hydrogel and silicone hydrogel reactive mixtures and to solutions for ophthalmic devices such as packaging solutions, multipurpose solutions, ophthalmic solutions, and of which may be used with contact lenses. The linear or branched HAMA polymers may have a degree of polymerization between about 100 and about 100,000, in some embodiments between about 500 and about 10,000, about 500 to about 7,500 and about 500 to about 2,000.

When the HAMA polymer of this embodiment comprises a single hydrophilic segment without a reactive group or substrate associative segment, the degree of polymerization of the N-hydroxyalkyl(meth)acrylamide must be sufficient to provide the desired degree of residence time in the hydrogel or ophthalmic device. For example, for a wetting agent which is meant to become persistently entrapped in the hydrogel throughout use, a degree of polymerization of at least about 500, at least about 1,000, in some embodiments between about 1,000 and about 10,000. For a wetting agent which is meant to elute from the lens, or for a polymer which is used to improve the release of the polymer from a mold or prevent sticking to a package, a degree of polymerization of about 100 to about 1000, is desirable. It will be appreciated that mixtures of HAMA polymers having different degrees of polymerization may be used.

Alternatively the linear or branched N-hydroxyalkyl (meth)acrylamide polymers comprise at least one hydrophilic, substrate associative segment or reactive group. The hydrophilic substrate associative group has an affinity for at least a portion of a medical device. For example, the substrate may contain at least one proton acceptor, which associates via hydrogen bonding with proton donating groups in the N-hydroxyalkyl(meth)acrylamide polymer. The substrate associating segment in this embodiment comprises between about 5 and about 200 repeating units.

The degree of polymerization (DP) ratio of N-hydroxyalkyl(meth)acrylamide segments to substrate associative segments (if present) is between 10:1 and 500:1, in other embodiments, with ratios between 30:1 and 200:1, between 50:1 and 200:1, and in other embodiments ratios between 70:1 and 200:1.

The HAMA polymer of the present invention may be formed via a number of polymerization processes. In one embodiment the HAMA polymer is formed using RAFT polymerization. In another embodiment the HAMA polymer are formed by conventional free radical polymerization.

The HAMA polymers may be incorporated into the substrate by a variety of methods. For example, the HAMA polymers may be added to the reaction mixture such that the substrate polymer polymerizes "around" HAMA polymer, forming a semi-interpenetrating network.

When added to a reactive mixture from which a substrate, such as a contact lens is made, the HAMA polymers may be used in amounts from about 1 to about 20 weight percent, more preferably about 5 to about 20 percent, most preferably about 6 to about 17 percent, all based upon the total of all reactive components.

Alternatively, the HAMA polymers may be included in a solution and then the solution is contacted with the desired substrate. In this embodiment, the HAMA polymer permeates or is imbibed into at least a portion of the substrate. For example, when the substrate is a hydrogel contact lens, the HAMA polymer may be incorporated into a solution in which the lens is packaged. The packaged lens may be heat treated to increase the amount of HAMA polymer which permeates the lens. Suitable heat treatments, include, but are not limited to conventional heat sterilization cycles, which include temperatures of about 120° C. for times of about 20 minutes. If heat sterilization is not used, the packaged lens may be separately heat treated. Suitable temperatures include those between about 40 and about 100° C. The HPMA polymer may also be introduced during the processing of the substrate. For example, where the substrate is a contact lens the HPMA polymer may be included in either or both of the extraction solvent and hydration solution.

When added to a solvent, such as water or any other solution, concentrations may be selected to provide the desired amount of HAMA polymer to the substrate. When the substrate is a contact lens, concentrations up to about 5 wt % of substrate, and between about 10 ppm and about 1 wt % may be used. Concentrations for other substrates may be calculated based upon the desired use. In one embodiment the solution comprising the HAMA polymer is free from visible haze (clear).

Suitable solvents include those which swell the substrate. In one embodiment, where the substrate is a hydrogel, the solution may be an aqueous solution such as water, a contact lens packaging solution, a contact cleaning and care solution, or any aqueous or non-aqueous solution used in the processing of contact lenses. Solvents for other substrates will be apparent to those of skill in the art. It is a benefit of the present invention that the step of associating the HAMA polymer with the desired substrate may be conducted in a single step without pretreatment, covalent reaction or tie layers. However, in some embodiments it may be desirable to contact the substrate/HAMA polymer construct with an additional polymer or nanogel to form a layered coating. The additional polymer may be linear, branched or crosslinked, and may have associating groups located at an end of the polymer, or throughout the polymer. Each additional polymer comprises groups which are capable of associating or reacting with groups contained in the polymer of the preceding layer. Thus, for substrates which were initially treated with at least one HAMA polymer (which comprises proton receiving groups), the addition polymer would comprise, consist or consist essentially of proton donating groups. Several alternating layers may be applied. Examples of polymers comprising proton receiving groups include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyethylene-oxide, poly-2-ethyl-oxazoline, heparin polysaccharides, polysaccharides, mixtures and copolymers (including block or random, branched, multichain, comb-shaped or star shaped) thereof, Polymers and copolymers of Poly-N-vinylpyrrolidone (PVP) and poly-N—N-dimethylacrylamide may be used.

The second solution may be any of the solutions described above for contacting the substrates with the HAMA polymer. The at least one second polymer may be present in the solution in concentrations up to about 50,000 ppm, between about 10 and 5000 ppm, or between about 10 and about 2000 ppm. Because both polymers are non-ionic, the additional treating steps may be done at pH between about 6 and 8 and in some embodiments at about 7.

Substrates

The HAMA polymers disclosed herein may be non-covalently associated with a variety of hydrophobic, partially hydrophobic, hydrophilic, or amphiphilic substrates, such as polymeric articles formed from polysiloxanes, silicone hydrogels, conventional hydrogels, polymethyl methacrylate, polyethylene, polypropylene, polycarbonate, polyethylene terapthalate, glass, and mixtures and copolymers thereof and the like. The association occurs, provided there is sufficient affinity between the functional groups contained on, within or throughout the HAMA polymer or within the optional hydrophilic associative segment and those found on or within a given substrate. Examples of substrates which may be treated to associate the HAMA polymers of the present invention therewith include polymers and metals used for implantable devices, sutures, graft substrates, punctal plugs, catheters, stents, wound dressings, surgical instruments, ophthalmic devices, coatings for any of the foregoing and the like.

Additional examples of at least partially hydrophobic polymer matrices include highly crosslinked ultra high molecular weight polyethylene (UHMWPE), which is used for implantable devices, such as joint replacements, are made typically has a molecular weight of at least about 400,000, and in some embodiments from about 1,000,000 to about 10,000,000 as defined by a melt index (ASTM D-1238) of essentially 0 and reduced specific gravity of greater than 8 and in some embodiments between about 25 and 30.

Absorbable polymers suitable for use as yarns in making sutures and wound dressings include but are not limited to aliphatic polyesters which include but are not limited to homopolymers and copolymers of lactide (which includes lactic acid d-, l- and meso lactide), glycolide (including glycolic acid), ε-caprolactone, p-dioxanone(1,4-dioxan-2-one), trimethylene carbonate (1,3-dioxan-2-one), alkyl derivatives of trimethylene carbonate, δ-vaterolactone, β-butyrolactone, γ-butyrolactone, ε-decalactone, hydroxybutyrate, hydroxyvalerate, 1,4-dioxepan-2-one (including its dimer 1,5,8,12-tetraoxacyclotetradecane-7,14-dione), 1,5-dioxepan-2-one, 6,6-dimethyl-1,4-dioxan-2-one and polymer blends thereof.

Non-absorbable polymer materials such as but are not limited to, polyamides(polyhexamethylene adipamide (nylon 66), polyhexamethylene sebacamide (nylon 610), polycapramide (nylon 6), polydodecanamide (nylon 12) and polyhexamethylene isophthalamide (nylon 61) copolymers and blends thereof), polyesters (e.g. polyethylene terephthalate, polybutyl terephthalate, copolymers and blends thereof), fluoropolymers (e.g. polytetrafluoroethylene and polyvinylidene fluoride)polyolefins (e.g. polypropylene including isotactic and syndiotactic polypropylene and blends thereof, as well as, blends composed predominately of isotactic or syndiotactic polypropylene blended with heterotactic polypropylene (such as are described in U.S. Pat. No. 4,557,264 issued Dec. 10, 1985 assigned to Ethicon, Inc. hereby incorporated by reference) and polyethylene (such as is described in U.S. Pat. No. 4,557,264 issued Dec. 10, 1985 assigned to Ethicon, Inc. and combinations thereof.

The body of the punctal plugs may be made of any suitable biocompatible polymer including, without limitation, silicone, silicone blends, silicone co-polymers, such as, for example, hydrophilic monomers of pHEMA (polyhydroxyethlymethacrylate), polyethylene glycol, polyvinylpyrrolidone, and glycerol. Other suitable biocompatible materials include, for example fluorinated polymers, such as, for example, polytetrafluoroethylene ("PTFE"), polyvinylidene fluoride ("PVDF"), and teflon; polypropylene; polyethylene; nylon; and ethylene vinyl alcohol ("EVA").

Polymeric parts of ultrasonic surgical instruments may be made from polyimides, fluora ethylene propene (FEP Teflon), PTFE Teflon, silicone rubber, EPDM rubber, any of which may be filled with materials such as Teflon or graphite or unfilled. Examples are disclosed in US20050192610 and U.S. Pat. No. 6,458,142. For these embodiments, the block copolymer may be mixed with a solvent that swells the at least partially hydrophobic polymer matrix and then contacted with the polymer matrix.

Ophthalmic Devices

In one embodiment, the HAMA polymers are associated with preformed articles including silicone ophthalmic devices such as lenses or punctal plugs, silicone hydrogel articles, such as silicone hydrogel lenses. Any of the HAMA polymers and copolymers of the present invention may be used with ophthalmic devices as polymer components, wetting agents, release agents and coating polymers, depending on how the HAMA polymer is incorporated into or associated with the ophthalmic device. For example, in one embodiment it is believed that the proton donating groups in HAMA polymers associate with proton acceptors in the polymer from which the ophthalmic device is formed. In this embodiment, the HAMA polymer is dissolved in a solvent which also swells the substrate. The polymer substrate is contacted with a solution comprising the HAMA polymer. When the substrate is a silicone hydrogel article, such as a contact lens, suitable solvents include packing solution, storing solution and cleaning solutions. Using this embodiment as an example, the silicone hydrogel lens is placed in a packing solution comprising the N-hydroxyalkyl(meth)acrylamide polymer. The N-hydroxyalkyl(meth)acrylamide polymer is present in the solution in amounts between about 0.001 and about 10%, in some embodiments between about 0.005 and about 2% and in other embodiments between about 0.01 and about 0.5 weight %, based upon all components in the solution.

The packing solutions may be any water-based solution that is used for the storage of contact lenses. Typical solutions include, without limitation, saline solutions, other buffered solutions, and deionized water. The preferred aqueous solution is saline solution containing salts including, without limitation, sodium chloride, sodium borate, sodium phosphate, sodium hydrogenphosphate, sodium dihydrogenphosphate, or the corresponding potassium salts of the same. These ingredients are generally combined to form buffered solutions that include an acid and its conjugate base, so that addition of acids and bases cause only a relatively small change in pH. These buffered solutions may also be used to clean or treat contact lenses. When the solutions of the present invention are used for cleaning, treatment or care of contact lenses they may include additional components useful for such solutions, including viscosity adjusting agents, antimicrobial agents, wetting agents, anti-stick agents, preservatives, polyelectrolytes, stabilizers, chelants, antioxidants, combinations thereof and the like. Examples of additional components include 2-(N-morpholino)ethanesulfonic acid (MES), sodium hydroxide, 2,2-bis(hydroxymethyl)-2,2',2"-nitrilotriethanol, n-tris(hydroxymethyl)methyl-2-aminoethanesulfonic acid, citric acid, sodium citrate, sodium carbonate, sodium bicarbonate, acetic acid, sodium acetate, ethylenediamine tetraacetic acid and the like and combinations thereof. Preferably, the solution is a borate buffered or phosphate buffered saline solution.

The HAMA polymer may also be associated with the lens using organic solvents (with or without water as a co-solvent). In one embodiment, an organic solvent is used to both swell the medical device, e.g. a contact lens medical device, and dissolve the HAMA polymer so that it may be imbibed. Suitable solvents may be selected to swell the medical device, to dissolve the HAMA polymer or both. In another embodiment the solvents may also be biocompatible so as to simplify manufacturing. The substrate is contacted with the HAMA polymer under conditions sufficient to incorporate a lubricious and surface-wetting effective amount of the HAMA polymer. As used herein, a lubricious effective amount, is an amount necessary to impart a level of lubricity which may be felt manually (such as by rubbing the device between one's fingers) or when the device is used. Additionally, as used herein, a surface-wetting effective amount is an amount necessary to impart a level of increased wettability to the lens, as determined via known contact angle measurement techniques (i.e. sessile drop, captive bubble, or dynamic contact angle measurements). It has been found that in one embodiment, where the device is a soft contact lens, amounts of HAMA polymer as little as 50 ppm provide improved lens "feel" and lowered surface contact angles, as measured by sessile drop. Amounts of HAMA polymer greater than about 50 ppm, and more preferably amounts greater than about 100 ppm in the processing packaging, storing or cleaning solution, add a more pronounced improvement in feel. Thus, in this embodiment, the HAMA polymer may included in a solution in concentrations up to about 50,000 ppm, in some embodiments between about 10 and 5000 ppm, and in some embodiments between about 10 and about 2000 ppm. The packaged lens may be heat treated to increase the amount of HAMA polymer which permeates and becomes entangled in the lens. Suitable heat treatments, include, but are not limited to conventional heat sterilization cycles, which include temperatures of about 120° C. for times of about 20 minutes and may be conducted in an autoclave. If heat sterilization is not used, the packaged lens may be separately heat treated. Suitable temperatures for separate heat treatment include at least about 40° C., and preferably between about 50° C. and the boiling point of the solution. Suitable heat treatment times include at least about 10 minutes. It will be appreciated that higher temperatures will require less treatment time.

The process may further comprise the additional step of treating the lens comprising the HAMA polymer with a second polymer which comprises proton receiving groups. Several alternating layers of HAMA and second polymer may be applied. Examples of polymers comprising proton receiving groups include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyethylene-oxide, poly-2-ethyloxazoline, heparin polysaccharides, polysaccharides, mixtures and copolymers (including block or random, branched, multichain, comb-shaped or star shaped) thereof, Polymers and copolymers of Poly-N-vinylpyrrolidone (PVP) and poly-N—N-dimethylacrylamide may be used.

The second solution may be any of the solutions described above for contacting the substrates with the HAMA polymer. The at least one second polymer may be present in the solution in concentrations up to about 50,000 ppm, between about 10 and 5000 ppm, or between about 10 and about 2000 ppm. Because both polymers are non-ionic, the additional treating steps may be done at pH between about 6 and 8 and in some embodiments at about 7.

Many silicone hydrogel materials are known and may be used, including but not limited to senofilcon, galyfilcon, lotrafilcon A and lotrafilcon B, delefilcon, balafilcon, comfilcon, osmofilcon, stenfilcon, enfilcon, filcon II, filcon IV and the like. Almost any silicone hydrogel polymer can be treated using the HAMA polymers provided herein, including but not limited to those disclosed in U.S. Pat. No. 6,637,929, WO03/022321, WO03/022322, U.S. Pat. No. 5,260,000, U.S. Pat. No. 5,034,461, U.S. Pat. No. 6,867,245, WO2008/061992, U.S. Pat. No. 5,760,100, U.S. Pat. No. 7,553,880, US20100048847, US2006/0063852.

Similar processes may be used for substrates made from polymers other than silicone hydrogels. The primary change will be in the selection of the solvent, which should solubilize the polymer and swell the substrate. Mixtures of solvents maybe used, and additional components, such as surfactants may be included if desired. For example where the article is a silicone article such as a silicone contact lens or a silicone punctal plug, the N-hydroxyalkyl(meth)acrylamide polymer may be dissolved in a solvent such as aliphatic alcohols, water and mixtures thereof. Specific examples include isopropanol, n-propanol and the like, at the concentrations described above.

In another embodiment, the HAMA polymer may be included in the reaction mixture from which the polymeric article is made. In such an embodiment, effective amounts of HAMA polymer might include quantities from about 1% to 20%, and in some embodiments from about 2% to 15%. For example, where the article is a silicone hydrogel contact lens, the HAMA polymer may be included, in amounts up to about 20 weight % in the contact lens reaction mixture with one or more silicone-containing components and one or more hydrophilic components. The silicone-containing components and hydrophilic components used to make the polymers disclosed herein can be any of the known components used in the prior art to make silicone hydrogels. These terms, specifically silicone-containing component and hydrophilic component, are not mutually exclusive, in that, the silicone-containing component can be somewhat hydrophilic and the hydrophilic component can comprise some silicone, because the silicone-containing component can have hydrophilic groups and the hydrophilic components can have silicone groups.

Useful silicone-containing components comprise polymerizable functional groups such as (meth)acrylate, (meth)acrylamide, N-vinyl lactam, N-vinylamide, and styryl functional groups. Examples of silicone-containing components which are useful may be found in U.S. Pat. Nos. 3,808,178; 4,120,570; 4,136,250; 4,153,641; 4,740,533; 5,034,461; 5,760,100; 4,139,513; 5,998,498; US2006/0063852 and 5,070,215; and EP080539. All of the patents cited herein are hereby incorporated in their entireties by reference. These references disclose many examples of olefinic silicone-containing components.

Suitable silicone-containing components include compounds of the following formula:

Formula II

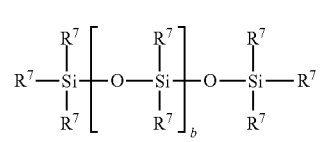

where $R^7$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^7$ comprises a monovalent reactive group, and in some embodiments between one and 3 $R^7$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, substituted or unsubstituted $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Suitable substituents on said $C_{1-6}$ alkyls include ethers, hydroxyls, carboxyls, halogens and combinations thereof. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment one $R^7$ is selected from $C_{1-6}$alkyl (meth)acrylates, and $C_{1-6}$alkyl(meth)acrylamides, which may be unsubstituted or substituted with hydroxyl, alkylene ether or a combination thereof. In another embodiment one $R^7$ is selected from propyl(meth)acrylates and propyl(meth)acrylamides, wherein said propyl may be optionally substituted with hydroxyl, alkylene ether or a combination thereof.

In one embodiment b is zero, one $R^7$ is a monovalent reactive group, and at least 3 $R^7$ are selected from monovalent alkyl groups having one to 6 carbon atoms, and in another embodiment from monovalent alkyl groups having one to 4 carbon atoms. Non-limiting examples of silicone components of this embodiment include (3-methacryloxy-2-hydroxypropyloxy)propylbis(trimethylsiloxy)methylsilane ("SiGMA"),
2-hydroxy-3-methacryloxypropyloxypropyl-tris(trimethylsiloxy)silane,
3-methacryloxypropyltris(trimethylsiloxy)silane ("TRIS"),
3-methacryloxypropylbis(trimethylsiloxy)methylsilane and
3-methacryloxypropylpentamethyl disiloxane.

In another embodiment, b is 2 to 20, 3 to 15 or in some embodiments 3 to 10; at least one terminal $R^7$ comprises a monovalent reactive group and the remaining $R^7$ are selected from monovalent alkyl groups having 1 to 16 carbon atoms, and in another embodiment from monovalent alkyl groups having 1 to 6 carbon atoms. In yet another embodiment, b is 3 to 15, one terminal $R^7$ comprises a monovalent reactive group selected from substituted or unsubstituted $C_{1-6}$alkyl (meth)acrylates, substituted or unsubstituted $C_{1-6}$alkyl(meth) acrylamides, the other terminal $R^7$ comprises a monovalent alkyl group having 1 to 6 carbon atoms and the remaining $R^7$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS"), N-(2,3-dihydroxypropane)-N'-(propyltetra(dimethylsiloxy)dimethylbutylsilane) acrylamide methacryamide silicones of the following formulae (s4) through (s9);

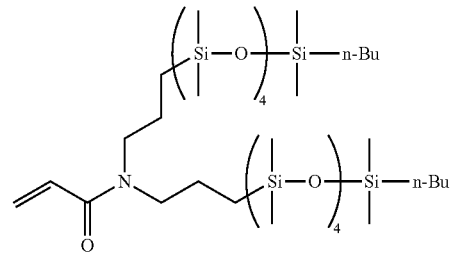

(s4)

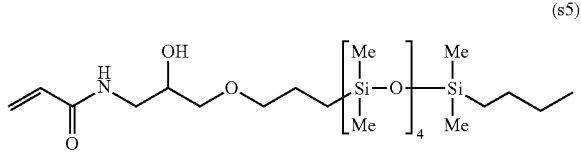

(s5)

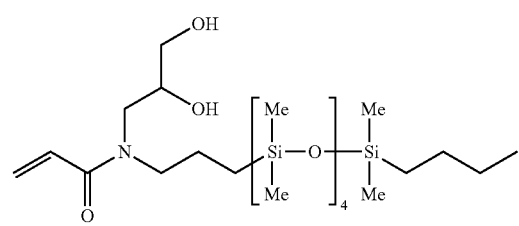

(s6)

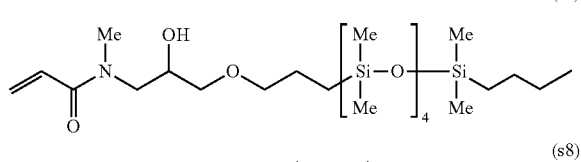

(s7)

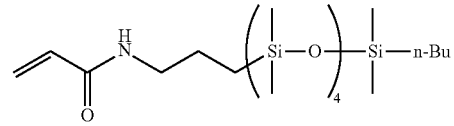

(s8)

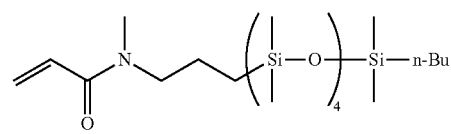

(s9)

In another embodiment b is 5 to 400 or from 10 to 300, both terminal $R^7$ comprise monovalent reactive groups and the remaining $R^7$ are independently selected from monovalent alkyl groups having 1 to 18 carbon atoms which may have ether linkages between carbon atoms and may further comprise halogen.

In another embodiment, one to four $R^7$ comprises a vinyl carbonate or carbamate of the formula:

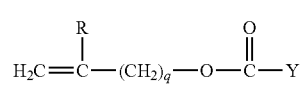

Formula III wherein: Y denotes O—, S— or NH—;
R denotes hydrogen or methyl; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris (trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

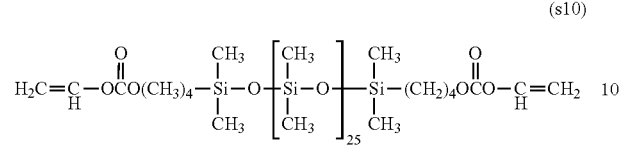
(s10)

Where biomedical devices with modulus below about 200 are desired, only one $R^7$ shall comprise a monovalent reactive group and no more than two of the remaining $R^7$ groups will comprise monovalent siloxane groups.

In one embodiment, where a silicone hydrogel lens is desired, the lens will be made from a reaction mixture comprising at least about 20 weight % and in some embodiments between about 20 and 70% wt silicone-containing components based on total weight of reactive monomer components from which the polymer is made.

Another class of silicone-containing components includes polyurethane macromers of the following formulae:

$(*D*A*D*G)_a*D*D*E^1$;

$E(*D*G*D*A)_a*D*G*D*E^1$ or;

$E(*D*A*D*G)_a*D*A*D*E^1$  Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

\* denotes a urethane or ureido linkage;

a is at least 1;

A denotes a divalent polymeric radical of formula:

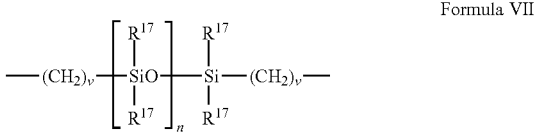
Formula VII $R^{17}$ independently denotes an alkyl or fluoro-substituted alkyl group having 1 to 10 carbon atoms which may contain ether linkages between carbon atoms; v is at least 1; and n provides a moiety weight of 400 to 10,000; each of E and $E^1$ independently denotes a polymerizable unsaturated organic radical represented by formula:

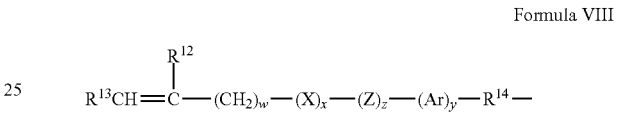
Formula VIII wherein: $R^{12}$ is hydrogen or methyl; $R^{13}$ is hydrogen, an alkyl radical having 1 to 6 carbon atoms, or a —CO—Y—$R^{11}$ radical wherein Y is —O—, —S— or —NH—; $R^{11}$ is a $C_{1-6}$ monovalent alkyl, and in some embodiments an unsubstituted $C_{1-3}$ alkyl; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

In one embodiment the silicone-containing component comprises a polyurethane macromer represented by the following formula:

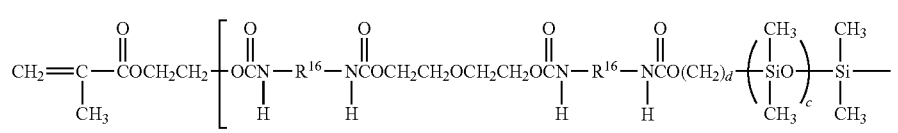
Formula IX

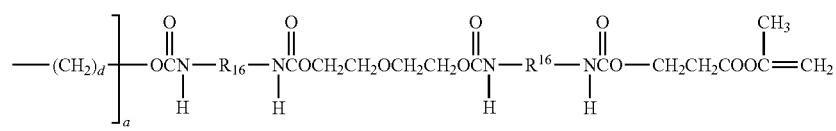

wherein $R^{16}$ is a diradical of a diisocyanate after removal of the isocyanate group, such as the diradical of isophorone diisocyanate, a is 1-5, d is 3-4 and c is 10-200 or 10-100. Another suitable silicone containing macromer is compound of formula X (in which f+g is a number in the range of 10 to 30 and h is a number in the range of 20-30, 22-26 or 25) formed by the reaction of fluoroether, hydroxy-terminated polydimethylsiloxane, isophorone diisocyanate and isocyanatoethylmethacrylate.

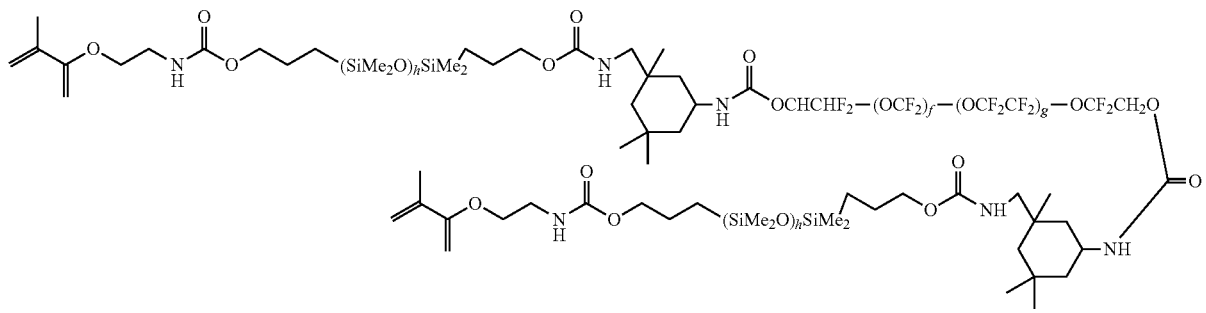

Formula X

Other silicone-containing components suitable for use include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone containing macromers made via GTP, such as those disclosed in U.S. Pat. Nos. 5,314,960, 5,331,067, 5,244,981, 5,371,147 and 6,367,929. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkages and crosslinkable monomers containing polyether and polysiloxanyl groups. Any of the foregoing polysiloxanes can also be used as the silicone-containing component.

In one embodiment of the present invention where a modulus of less than about 120 psi is desired, the majority of the mass fraction of the silicone-containing components used in the lens formulation should contain only one polymerizable functional group ("monofunctional silicone containing component"). In this embodiment, to insure the desired balance of oxygen transmissibility and modulus it is preferred that all components having more than one polymerizable functional group ("multifunctional components") make up no more than 10 mmol/100 g of the reactive components, and preferably no more than 7 mmol/100 g of the reactive components.

In another embodiment, the reaction mixtures are substantially free of silicone containing components which contain trimethylsiloxy groups.

The silicone containing components may be present in amounts up to about 85 weight %, and in some embodiments between about 10 and about 80 and in other embodiments between about 20 and about 70 weight %, based upon all reactive components.

Hydrophilic components include those which are capable of providing at least about 20% and in some embodiments at least about 25% water content to the resulting lens when combined with the remaining reactive components. Suitable hydrophilic components include hydrophilic monomers, prepolymers and polymers and may be present in amounts between about 10 to about 60 weight % based upon the weight of all reactive components, in some embodiments about 15 to about 50 weight %, and in other embodiments between about 20 to about 40 weight %. The hydrophilic monomers that may be used to make the polymers have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group

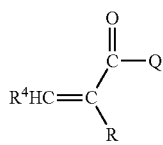

Formula XI wherein R is H or $CH_3$, $R^4$ is H, $C_{1-3}$ unsubstituted alkyl or carbonyl, and X is O or N, which are also known to polymerize readily, such as N,N-dimethylacrylamide (DMA), 2-hydroxyethyl(meth)acrylate, glycerol methacrylate, N-(2-hydroxyethyl)(meth)acrylamide, N-2-hydroxypropyl(meth)acrylamide, N-3-hydroxypropyl(meth)acrylamide, N-2-hydroxyethyl(meth)acrylamide, N,N-bis(2-hydroxyethyl)acrylamide,

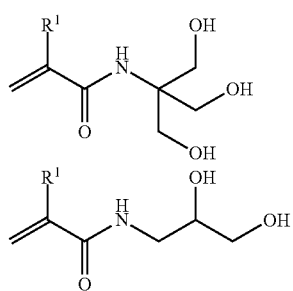

polyethyleneglycol monomethacrylate, methacrylic acid, acrylic acid, mixtures thereof and the like.

Hydrophilic vinyl-containing monomers which may be incorporated into the hydrogels include monomers such as N-vinyl lactams (e.g. N-vinyl pyrrolidone (NVP)), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone); N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, vinylimidazole, with NVP being preferred in one embodiment.

Additional hydrophilic monomers which may be used include acrylamide, N,N-bis(2-hydroxyethyl)acrylamide, acrylonitrile, N-isopropyl acrylamide, vinyl acetate, (meth)acrylic acid, polyethylene glycol(meth)acrylates, 2-ethyl oxazoline, N-(2-hydroxypropyl)(meth)acrylamide, N-(2-hydroxyethyl)(meth)acrylamide, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl) dimethylammonio)propane-1-sulfonate (APDAPS), methacryloyloxy)propyl)dimethylammonio)propane-1-sulfonate (MAPDAPS), N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, and the like, and mixtures thereof. In one embodiment suitable hydrophilic monomers comprise N-vinyl pyrrolidone, N-vinyl-N-methylacetamide, 2-methacryloyloxyethyl phosphorylcholine, (meth)acrylic acid, N,N-dimethylacrylamide, N-hydroxypropyl methacrylamide, mono-glycerol methacrylate, 2-hydroxyethyl acrylamide, bishydroxyethyl acrylamide, and 2,3-dihydroxypropyl(meth)acrylamide and the like and mixtures thereof.

In some embodiments the hydrophilic monomers may also comprise charged monomers including but not limited to methacrylic acid, acrylic acid, 3-acrylamidopropionic acid (ACA1), 4-acrylamidobutanoic acid, 5-acrylamidopentanoic acid (ACA2), 3-acrylamido-3-methylbutanoic acid (AMBA), N-vinyloxycarbonyl-α-alanine, N-vinyloxycarbonyl-β-alanine (VINAL), 2-vinyl-4,4-dimethyl-2-oxazolin-5-one (VDMO), reactive sulfonate salts, including, sodium-2-(acrylamido)-2-methylpropane sulphonate (AMPS), 3-sulphopropyl(meth)acrylate potassium salt, 3-sulphopropyl (meth)acrylate sodium salt, bis 3-sulphopropylitaconate disodium, bis 3-sulphopropyl itaconate di potassium, vinyl sulphonate sodium salt, vinyl sulphonate salt, styrene sulfonate, sulfoethyl methacrylate, combinations thereof and the like.

Other hydrophilic monomers that can be employed include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

In one embodiment the hydrophilic monomers which may be incorporated into the polymers disclosed herein include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), N-vinyl methacrylamide, HEMA, and polyethyleneglycol monomethacrylate.

In another embodiment the hydrophilic monomers include DMA, NVP, HEMA and mixtures thereof.

For embodiments where the N-hydroxyalkyl(meth)acrylamide polymer is included in an ophthalmic solutions which comes in contact with an ophthalmic device such as a contact lens, the reactive mixtures used to form the ophthalmic devices may also comprise as hydrophilic components one or more polymeric wetting agents. As used herein, such polymeric wetting agents used in reaction mixtures refers to substances having a weight average molecular weight of no less than about 5,000 Daltons, wherein said substances upon incorporation to silicone hydrogel formulations, increase the wettability of the cured silicone hydrogels. In one embodiment the weight average molecular weight of these polymeric wetting agents is greater than about 30,000; in another between about 150,000 to about 2,000,000 Daltons, in yet another between about 300,000 to about 1,800,000 Daltons, and in yet another about 500,000 to about 1,500,000 Daltons. These wetting agents may be in addition to the HAMA polymers of the present invention.

Alternatively, the molecular weight of polymeric wetting agents can be also expressed by the K-value, based on kinematic viscosity measurements, as described in Encyclopedia of Polymer Science and Engineering, N-Vinyl Amide Polymers, Second edition, Vol. 17, pgs. 198-257, John Wiley & Sons Inc. When expressed in this manner, hydrophilic monomers having K-values of greater than about 46 and in one embodiment between about 46 and about 150. Suitable amounts of polymeric wetting agents in reaction mixtures include from about 1 to about 20 weight percent, in some embodiments about 5 to about 20 percent, in other embodiments about 6 to about 17 percent, all based upon the total of all reactive components.

Examples of suitable additional polymeric wetting agents include but are not limited to polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Polymeric wetting agents made from DMA or N-vinyl pyrrolidone with glycidyl methacrylate may also be used. The glycidyl methacrylate ring can be opened to give a diol which may be used in conjunction with other hydrophilic prepolymer in a mixed system to increase the compatibility of the component in the reactive mixture. In one embodiment the polymeric wetting agents contain at least one cyclic moiety in their backbone, such as but not limited to, a cyclic amide or cyclic imide. Polymeric wetting agents include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyethylene-oxide, poly-2-ethyl-oxazoline, heparin polysaccharides, polysaccharides, mixtures and copolymers (including block or random, branched, multichain, comb-shaped or star shaped) thereof, where poly-N-vinylpyrrolidone (PVP) and poly-N—N-dimethylacrylamide are particularly preferred in one embodiment. Copolymers might also be used such as graft copolymers of PVP or DMA.

The polymeric wetting agents used in reaction mixtures also provide improved wettability, and particularly improved in vivo wettability to the medical devices. Without being bound by any theory, it is believed that the polymeric wetting agents are hydrogen bond receivers which in aqueous environments, hydrogen bond to water, thus becoming effectively more hydrophilic. The absence of water facilitates the incorporation of the polymeric wetting agents in the reaction mixture. Aside from the specifically named polymeric wetting agents, it is expected that any polymer will be useful provided that when said polymer is added to a formulation, the polymer (a) does not substantially phase separate from the reaction mixture and (b) imparts wettability to the resulting cured polymer network. In some embodiments it is preferred that the polymeric wetting agents be soluble in the diluent at reaction temperatures.

Compatibilizing agents may also be used. In some embodiments the compatibilizing component may be any functionalized silicone containing monomer, macromer or prepolymer which, when polymerized and/or formed into a final article is compatible with the selected hydrophilic components. The compatibility test disclosed in WO03/022321 may be used to select suitable compatibilizing agents. In some embodiments, a silicone monomer, prepolymer or macromer which also comprises hydroxyl groups is included in the reaction mixture. Examples include 3-methacryloxy-2-hydroxypropyloxy)propylbis(trimethylsiloxy)methylsilane, mono-(3-methacryloxy-2-hydroxypropyloxy)propyl terminated, mono-butyl terminated polydimethylsiloxane (MW 1100), hydroxyl functionalized silicone containing GTP macromers, hydroxyl functionalized macromers comprising polydimethyl siloxanes, combinations thereof and the like. In another embodiment, the polymeric wettings may be used as compatibilizing components.

The hydroxyl containing component may also act as a cross-linking agent during the formation of substrates such as contact lenses.

With respect to making substrates such as contact lenses, it is generally necessary to add one or more cross-linking agents, also referred to as cross-linking monomers, to the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other poly(meth)acrylate esters, such as the end-capped polyoxyethylene polyols described above containing two or more terminal methacrylate moieties. The cross-linking agents are used in the usual amounts, e.g., from about 0.000415 to about 0.0156 mole per 100 grams of reactive components in the reaction mixture. Alternatively, if the hydrophilic monomers and/or the silicone containing monomers act as the cross-linking agent, the addition of a crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone containing monomer which can act as a crosslinking agent and, when present, does not require the addition of a crosslinking monomer to the reaction mixture includes α,ω-bismethacryloypropyl polydimethylsiloxane.

The reaction mixture may contain additional components such as, but not limited to, UV absorbers, photochromic compounds, pharmaceutical and nutriceutical compounds, antimicrobial compounds, reactive tints, pigments, copolymerizable and nonpolymerizable dyes, release agents and combinations thereof.

Generally the reactive components are mixed in a diluent to form a reaction mixture. Suitable diluents are known in the art. For silicone hydrogels suitable diluents are disclosed in WO 03/022321, U.S. Pat. No. 6,020,445 the disclosure of which is incorporated herein by reference.

Classes of suitable diluents for silicone hydrogel reaction mixtures include alcohols having 2 to 20 carbons, amides having 10 to 20 carbon atoms derived from primary amines and carboxylic acids having 8 to 20 carbon atoms. In some embodiments primary and tertiary alcohols are preferred. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy) propylbis(trimethylsiloxy)methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Suitable diluents for non-silicone containing reaction mixtures include glycerin, ethylene glycol, ethanol, methanol, ethyl acetate, methylene chloride, polyethylene glycol, polypropylene glycol, low molecular weight PVP, such as disclosed in U.S. Pat. No. 4,018,853, U.S. Pat. No. 4,680,336 and U.S. Pat. No. 5,039,459, including, but not limited to boric acid esters of dihydric alcohols, combinations thereof and the like.

Mixtures of diluents may be used. The diluents may be used in amounts up to about 55% by weight of the total of all components in the reaction mixture. More preferably the diluent is used in amounts less than about 45% and more preferably in amounts between about 15 and about 40% by weight of the total of all components in the reaction mixture.

A polymerization initiator is preferably included in the reaction mixture used to form substrates such as contact lenses. The polymerization initiators includes compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis (2,6-dimethoxybenzoyl)-2,4-4-trimethylpentyl phosphine oxide (DMBAPO), and the preferred method of polymerization initiation is visible light. The most preferred is bis(2,4,6-trimethylbenzoyl)-phenyl phosphine oxide (Irgacure 819®).

The preferred range of silicone-containing monomer present in the reaction mixture is from about 5 to 95 weight percent, more preferably about 30 to 85 weight percent, and most preferably about 45 to 75 weight percent of the reactive components in the reaction mixture. The preferred range of hydrophilic monomer present is from about 5 to 80 weight percent, more preferably about 10 to 60 weight percent, and most preferably about 20 to 50 weight percent of the reactive components in the reaction mixture. The preferred range of diluent present is from about 2 to 70 weight percent, more preferably about 5 to 50 weight percent, and most preferably about 15 to 40 weight percent of the total reaction mixture (including reactive and nonreactive components).

The reaction mixtures can be formed by any of the methods known to those skilled in the art, such as shaking or stirring, and used to form polymeric articles or devices by known methods.

For example, the biomedical devices may be prepared by mixing reactive components and the diluent(s) with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197, 266. The preferred method for producing contact lenses is by the molding of the silicone hydrogels, which is economical, and enables precise control over the final shape of the hydrated lens. For this method, the reaction mixture is placed in a mold having the shape of the final desired silicone hydrogel, i.e., water-swollen polymer, and the reaction mixture is subjected to conditions whereby the monomers polymerize, to thereby produce a polymer/diluent mixture in the shape of the final desired product. Then, this polymer/diluent mixture is treated with a solvent to remove the diluent and ultimately replace it with water, producing a silicone hydrogel having a final size and shape which are quite similar to the size and shape of the original molded polymer/diluent article. This method can be used to form contact lenses and is further described in U.S. Pat. Nos. 4,495,313; 4,680,336; 4,889,664; and 5,039,459, incorporated herein by reference.

Biomedical devices, and particularly ophthalmic lenses, have a balance of properties which makes them particularly useful. Such properties include clarity, water content, oxygen permeability and contact angle. The incorporation of at least one block copolymer according to embodiments of the present invention provides articles having very desirable wettability/contact angles with solutions and improved biometric performance as evidenced by reduced lipocalin, lipid and mucin uptake levels. Silicone hydrogel contact lenses incorporating the block copolymers will display contact angles of less than about 60° and in some embodiments less than about 40°, and decreases in contact angle of 40% and in some embodiments 50% or more. Lipid uptake can be lowered by 50% or more and silicone hydrogel lenses having about 12 μg, 10 μg, or even 5 μg or less may be produced. In one embodiment, the biomedical devices are contact lenses having a water content of greater than about 17%, preferably greater than about 20% and more preferably greater than about 25%.

Suitable oxygen permeabilities for silicone containing lenses are preferably greater than about 40 barrer and more preferably greater than about 60 barrer.

In some embodiments the articles of the present invention have combinations of the above described oxygen permeability, water content and contact angle. All combinations of the above ranges are deemed to be within the present invention.

The non-limiting examples below further describe this invention.

Test Methods

Wettability of lenses can be determined using a sessile drop technique measured using KRUSS DSA-100 TM instrument at room temperature and using DI water as probe solution. The lenses to be tested (3-5/sample) were rinsed in DI water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface on contact lens plastic moulds. The plastic mould and the lens were placed in the sessile drop instrument holder, ensuring proper central syringe alignment and that the syringe corresponds to the assigned liquid. A 3 to 4 microliter of DI water drop was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds and the contact angle was computed based on the contact angle measured between the drop image and the lens surface.

The water content may be measured as follows: lenses to be tested were allowed to sit in packing solution for 24 hours. Each of three test lens were removed from packing solution using a sponge tipped swab and placed on blotting wipes which have been dampened with packing solution. Both sides of the lens were contacted with the wipe. Using tweezers, the test lens were placed in a weighing pan and weighed. The two more sets of samples were prepared and weighed as above. The pan was weighed three times and the average is the wet weight.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for four hours. The purge valve was opened and the oven was allowed reach atmospheric pressure. The pans were removed and weighed. The water content was calculated as follows:

Wet weight = combined wet weight of pan and lenses − weight of weighing pan

Dry weight = combined dry weight of pan and lens − weight of weighing pan $$\% \text{ water content} = \frac{(\text{wet weight} - \text{dry weight})}{\text{wet weight}} \times 100$$

The average and standard deviation of the water content are calculated for the samples are reported.

Oxygen permeability (Dk) may be determined by the polarographic method generally described in ISO 18369-4: 2006 (E), but with the following variations. The measurement is conducted at an environment containing 2.1% oxygen. This environment is created by equipping the test chamber with nitrogen and air inputs set at the appropriate ratio, for example 1800 ml/min of nitrogen and 200 ml/min of air. The t/Dk is calculated using the adjusted pO2. Borate buffered saline was used. The dark current was measured by using a pure humidified nitrogen environment instead of applying MMA lenses. The lenses were not blotted before measuring. Four lenses with uniform thickness in the measurement area were stacked instead of using lenses of varied thickness. The L/Dk of 4 samples with significantly different thickness values are measured and plotted against the thickness. The inverse of the regressed slope is the preliminary Dk of the sample. If the preliminary Dk of the sample is less than 90 barrer, then an edge correction of (1+(5.88(CT in cm))) is applied to the preliminary L/Dk values. If the preliminary Dk of the sample is greater than 90 barrer, then an edge correction of (1+(3.56 (CT in cm))) is applied to the preliminary L/Dk values. The edge corrected L/Dk of the 4 samples are plotted against the thickness. The inverse of the regressed slope is the Dk of the sample. A curved sensor was used in place of a flat sensor. The resulting Dk value is reported in barrers.

Lipocalin uptake can be measured using the following solution and method. The lipocalin solution contained B Lactoglobulin (Lipocalin) from bovine milk (Sigma, L3908) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using the lipocalin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lipocalin solution. Each lens was fully immersed in the solution. Control lenses were prepared using PBS as soak solution instead of lipocalin. The plates containing the lenses immersed in lipocalin solution as well as plates containing control lenses immersed in PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Lipocalin uptake can be determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lipocalin solution. Optical density was measured using a SynergyII Micro-plate reader capable for reading optical density at 562 nm.

Mucin uptake can be measured using the following solution and method. The Mucin solution contained Mucins from bovine submaxillary glands (Sigma, M3895-type 1-S) solubilized at a concentration of 2 mg/ml in phosphate saline buffer (Sigma, D8662) supplemented by sodium bicarbonate at 1.37 g/l and D-Glucose at 0.1 g/l.

Three lenses for each example were tested using Mucin solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of Mucin solution. Each lens was fully immersed in the solution. Control lenses were prepared using PBS as soak solution instead of lipocalin.

The plates containing the lenses immersed in Mucin as well as plates containing control lenses immersed in PBS were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile 24 well plates each well containing 1 ml of PBS solution.

Mucin uptake can be determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in Mucin solution. Optical density was measured using a SynergyII Micro-plate reader capable for reading optical density at 562 nm.

Cell viability can be evaluated in vitro using a reconstituted corneal epithelium tissue construct. The tissue construct was a full thickness corneal epithelium (corneal epitheliam tissue from Skinethics) reconstituted and grown in vitro on a polycarbonate insert at the air liquid interface to form a fully stratified epithelial construct.

For the evaluation of lenses a punch biopsy (0.5 $cm^2$) of the lens was applied topically onto the tissue followed by a 24-hour incubation at 37° C., 5% $CO_2$. The lens biopsy was removed, and tissue was washed with PBS. Cell viability was then measured using the MTT colorimetric assay (Mosman, T. Rapid colorimetric assay for cellular growth and survival: application to proliferation and cytotoxicity assays. J. Immunol. Methods, 65; 55-63 (1983)): tissues were incubated in the presence of MTT for 3 hours at 37° C., 5% $CO_2$, followed by extraction of the tissues in isopropyl alcohol. Absorbance of the isopropyl alcohol extracts was then measured at 550 nm using a microplate reader. Results were expressed as a percentage of the PBS control (tissues treated with PBS versus lens-treated tissues).

For the evaluation of solutions 30 µg of solution was applied topically onto the tissue. The rest of the cell viability was as described for lenses. Each evaluation was done in triplicate.

Lipid uptake was measured as follows:

A standard curve was set up for each lens type under investigation. Tagged cholesterol (cholesterol labeled with NBD ([7-nitrobenζ-2-oxa-1,3-diazol-4-yl], CH-NBD; Avanti, Alabaster, Ala.)) was solubilized in a stock solution of 1 mg/mL lipid in methanol at 35° C. Aliquots were taken from this stock to make standard curves in phosphate-buffered saline (PBS) at pH 7.4 in a concentration range from 0 to 100 micg/mL.

One milliliter of standard at each concentration was placed in the well of a 24-well cell culture plate. 10 lenses of each type were placed in another 24-well plate and soaked alongside the standard curve samples in 1 mL of a concentration of 20 micg/ml of CH-NBD. Another set of lenses (5 lenses) were soaked in PBS without lipids to correct for any autofluorescence produced by the lens itself. All concentrations were made up in phosphate buffered saline (PBS) at pH 7.4. Standard curves, test plates (containing lenses soaked in CH-NBD) and control plates (containing lenses soaked in PBS) were all wrapped in aluminum foil to maintain darkness and were incubated for 24 hours, with agitation at 35.C. After 24 hours the standard curve, test plates and control plates were removed from the incubator. The standard curve plates were immediately read on a micro-plate fluorescence reader (Synergy HT)).

The lenses from the test and control plates were rinsed by dipping each individual lens 3 to 5 times in 3 consecutive vials containing approximately 100 ml of PBS to ensure that only bound lipid would be determined without lipids carryover. The lenses were then placed in a fresh 24-well plate containing 1 mL of PBS in each well and read on the fluorescence reader. After the test samples were read, the PBS was removed, and 1 mL of a fresh solution of CH-NBD were placed on the lenses in the same concentrations as previously mentioned and placed back in the incubator at 35° C., with rocking, until the next period. This procedure was repeated for 15 days until complete saturation of lipids on lenses. Only the lipid amount obtained at saturation was reported.

Lysozyme uptake can be measured as follows: The lysozyme solution used for the lysozyme uptake testing contained lysozyme from chicken egg white (Sigma, L7651) solubilized at a concentration of 2 mg/ml in phosphate saline buffer supplemented by Sodium bicarbonate at 1.37 g/l and D-Glucose at 0.1 g/l.

The lipocalin solution contained B Lactoglobulin (Lipocalin) from bovine milk (Sigma, L3908) solubilized at a concentration of 2 mg/ml in phosphate saline buffer supplemented by Sodium bicarbonate at 1.37 g/l and D-Glucose at 0.1 g/l.

Three lenses for each example were tested using each protein solution, and three were tested using PBS as a control solution. The test lenses were blotted on sterile gauze to remove packing solution and aseptically transferred, using sterile forceps, into sterile, 24 well cell culture plates (one lens per well) each well containing 2 ml of lysozyme solution. Each lens was fully immersed in the solution. 2 ml of the lysozyme solution was placed in a well without a contact lens as a control.

The plates containing the lenses and the control plates containing only protein solution and the lenses in the PBS, were parafilmed to prevent evaporation and dehydration, placed onto an orbital shaker and incubated at 35° C., with agitation at 100 rpm for 72 hours. After the 72 hour incubation period the lenses were rinsed 3 to 5 times by dipping lenses into three (3) separate vials containing approximately 200 ml volume of PBS. The lenses were blotted on a paper towel to remove excess PBS solution and transferred into sterile conical tubes (1 lens per tube), each tube containing a volume of PBS determined based upon an estimate of lysozyme uptake expected based upon on each lens composition. The lysozyme concentration in each tube to be tested needs to be within the albumin standards range as described by the manufacturer (0.05 microgram to 30 micrograms). Samples known to uptake a level of lysozyme lower than 100 µg per lens were diluted 5 times. Samples known to uptake levels of lysozyme higher than 500 µg per lens (such as etafilcon A lenses) are diluted 20 times.

1 ml aliquot of PBS was used for all samples other than etafilcon. 20 ml were used for etafilcon A lens. Each control lens was identically processed, except that the well plates contained PBS instead of either lysozyme or lipocalin solution.

Lysozyme and lipocalin uptake was determined using on-lens bicinchoninic acid method using QP-BCA kit (Sigma, QP-BCA) following the procedure described by the manufacturer (the standards prep is described in the kit) and is calculated by subtracting the optical density measured on PBS soaked lenses (background) from the optical density determined on lenses soaked in lysozyme solution.

Optical density can be measured using a SynergyII Microplate reader capable for reading optical density at 562 nm.

The following abbreviations will be used throughout the Preparations and Examples and have the following meanings.

ACA1 3-acrylamidopropionic acid;
ACA2 5-acrylamidopentanoic acid;
4-BBB 4-(bromomethyl)benzoyl bromide (Sigma-Aldrich);
DMA N,N-dimethylacrylamide
Irgacure-819 bis(2,4,6-trimethylbenzoyl)-phenylphosphineoxide (Ciba Specialty Chemicals);
KX potassium O-ethyl xanthogenate;
mPDMS monomethacryloxypropyl terminated mono-n-butyl terminated polydimethylsiloxanes (800-1000 MW);
NaHTTC sodium hexyltrithiocarbonate;
HBTTC S-hexyl-S'-benzyl-trithiocarbonate
XG1996TTC S-hexyl-S'-4-(2-(n-butylpolydimethylsiloxydimethylsilyl)ethyl)benzyl carbonotrithioate;
nBPDMS-H 3-(n-butyltetramethylsiloxydimethylsilyl)propanol
MBA N,N'-methylenebisacrylamide
MBMA N,N'-methylene bismethacrylamide (TCI)
NVP N-vinylpyrrolidone (Acros Chemical), further purified via vacuum distillation;
NRPTHP polysiloxane terminated block copolymer comparison produced in Preparation 3;
PTHPWCL polysiloxane terminated block copolymer with cross-links produced in Preparation 3;
HO-mPDMS mono-(2-hydroxy-3-methacryloxypropyl)-propyl ether terminated polydimethylsiloxane (400-1000 MW));
SBX 3-(n-butyltetramethylsiloxydimethylsilyl)propyl 4-((ethoxycarbonothioylthio)methyl)benzoate;
SiGMA 2-methyl-,2-hydroxy-3-[3-[1,3,3,3-tetramethyl-1-[(trimethylsilyl)oxy]disiloxanyl]propoxy]propyl ester;

TRIS-VC tris(trimethylsiloxy)silylpropyl vinyl carbamate;

$V_2D_{25}$ a silicone-containing vinyl carbonate describe at col. 4, lines 33-42 of U.S. Pat. No. 5,260,000

XG-1996 4-(2-(n-butylpolydimethylsiloxydimethylsilyl) ethyl)benzyl chloride, MW~1000;

XG1996HTTC S-hexyl-S'-4-(2-(n-butylpolydimethylsiloxysilyl)ethyl)benzyl carbonotrithioate (preparation 1); and D3O 3,7-dimethyl-3-octanol HPMA N-(2-hydroxypropyl)methacrylamide (Polysciences, Inc.)

(VA-044) 2,2'-azobis[2-(2-imidazoliN-2-yl)propane]dihydrochloride, Wako Specialty Chemicals V-501 4,4'-Azobis(4-Cyanovaleric Acid) (Wako Specialty Chemical)

DPBS Dulbecco's Phosphate Buffered Saline 1× (Cellgro)

BBPS is an ophthalmic solution containing the following components

| Component | Wt % |
|---|---|
| Deionized Water | 98.48 |
| Sodium Chloride | 0.44 |
| Boric Acid | 0.89 |
| Sodium Borate Decahydrate | 0.17 |
| Ethylenediamine Tetraacetate (EDTA) | 0.01 |

Preparation 1.

Preparation 1. Synthesis of Linear PHPMA Homopolymer

HPMA and V-501 were used as received.

650 g of HPMA and 4875 g DI water were added to a 12 L flask equipped with a sparge tube, overhead stirrer, and temperature probe. The resulting solution was sparged with $N_2$ and stirred at 250 rpm for two hours while allowing the solution temperature to reach 65° C.

Once the reaction at reached 65° C., 0.85 g V-501 was added and the solution temperature was raised to 70° C. and held at that temperature for 24 hours. The heat was removed and the reaction was allowed to cool to 40° C.

The resulting polymer solution was divided into 600 mL portions and each portion was precipitated from 2 L of acetone. The isolated solid polymer was filtered and dried overnight in a hood, then broken up and dried over 24-48 hours. Because the polymer was still wet, it was placed in a Waring blender with 2 L of acetone (in 5 portions) and blended for 2 minutes to remove additional water. The solid ground polymer was once again isolated and dried for 24-48 hours at 50-55° C. The polymer was then dissolved in 4500 g of methanol and precipitated (portion-wise) from acetone in a Waring blender. The high shear precipitate resulted in a fine powder which was easily isolated via filtration and dried to a constant weight over 48 hours. The final polymer yield was 84.9%. The polymer was analyzed for MW and MWD via SEC-MALLS.

EXAMPLE 1 AND COMPARATIVE EXAMPLE 1

Senofilcon A lenses were removed from their packages and transferred to glass vials containing 3 mL of BBPS (Comparative Example 1) or 3 mL of BBPS containing 5000 ppm PHPMA (Example 1) polymer from Preparation 1. The lenses were capped and crimp-sealed and subsequently sterilized at 124° C. for 30 minutes. The following biometrics data was obtained for lenses treated with the HPMA polymer, and for untreated senofilcon A lenses (Comparative Example 1). The results are shown in Table 1, below.

TABLE 1

| Property | CE 1 | Ex 1 |
|---|---|---|
| HPMA | NO | YES |
| Lipid Uptake | 31.89 (µg/lens) | 17.2 (µg/lens) |
| Sessile Drop | 48.3° | 51.6° |
| CoF | 1.0 | 2.05 |
| Mucin | 5.23 (µg/lens) | 3.23 (µg/lens) |
| Lipocalin | 3.32 (µg/lens) | 2.4 (µg/lens) |

The HPMA polymer dramatically reduced lipid uptake compared to the untreated control lens of Comparative Example 1. Mucin and lipocalin uptake of the lenses of the present invention were also reduced compared to the control.

The invention claimed is:

1. A medical device comprising a cross-linked polymer matrix and at least one water soluble, non-reactive hydrophilic polymer comprising less than 20 mol % anionic repeating units and repeating units derived from N-(2-hydroxyalkyl)(meth)acrylamide of Formula I

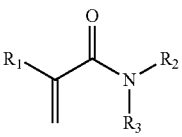

Wherein $R^1$ is hydrogen or methyl,
$R^2$ is H or a $C_{1-4}$ alkyl substituted with at least one hydroxyl group; and
$R^3$ is a $C_{1-4}$ alkyl substituted with at least one hydroxyl group;
wherein said water soluble, non-reactive hydrophilic polymer has a degree of polymerization of about 100 to about 100,000 and is free of terminal, hydrophobic polymer blocks.

2. The device of claim 1 wherein said cross-linked polymer matrix is uncharged.

3. The device of claim 1 wherein said device is a contact lens formed from a hydrogel comprising at least one hydrophilic component.

4. The device of claim 1 wherein said cross-linked polymer matrix is formed from a mixture of reactive components and said non-reactive hydrophilic polymer is present in an amount between about 1 to about 20 weight percent, based upon the total of all reactive components and hydrophilic polymer.

5. The device of claim 4 wherein said non-reactive hydrophilic polymer is present in an amount between about 3 to about 15 percent, based upon the total of all reactive components and said non-reactive hydrophilic polymer.

6. The device of claim 4 wherein said hydrophilic polymer is present in an amount between about 5 to about 12 weight percent, based upon the total of all reactive components and said non-reactive hydrophilic polymer.

7. The device of claim 1 wherein said hydrophilic polymer has a degree of polymerization between about 500 and about 10,000.

8. The device of claim 1 wherein said non-reactive hydrophilic polymer is linear or branched.

9. The device of claim 1 wherein said non-reactive hydrophilic polymer has a degree of polymerization between about 500 and about 7,500.

10. The device of claim 1 wherein said non-reactive hydrophilic polymer has a degree of polymerization between about 500 and about 2000.

11. The device of claim 1 wherein said non-reactive hydrophilic polymer is not cross-linked.

12. The device of claim 1 wherein said non-reactive hydrophilic polymer is free of repeating units capable of crosslinking under free radical polymerization conditions.

13. The device of claim 1 wherein said non-reactive hydrophilic polymer is free of repeating units derived from bioactive linker group.

14. The device of claim 1 wherein said non-reactive hydrophilic polymer is either a homopolymer or a random copolymer.

15. The device of claim 1 wherein said non-reactive hydrophilic polymer comprises less than about 10 mol % anionic repeating units.

16. The device of claim 1 wherein said non-reactive hydrophilic polymer is non-ionic.

17. The device of claim 1 wherein $R^3$ is selected from the group consisting of, 2-hydroxypropyl, 3-hydroxypropyl, 2,3-dihydroxypropyl, 4-hydroxy butyl, 2-hydroxy-1,1-bis(hydroxymethyl)ethyl.

18. The device of claim 1 wherein said N-(2-hydroxyalky)(meth)acrylamide is selected from the group consisting of N-(2-hydroxy propyl)(meth)acrylamide, N-(3-hydroxypropyl)(meth)acrylamide, N-(2-hydroxyethyl)(meth)acrylamide, and

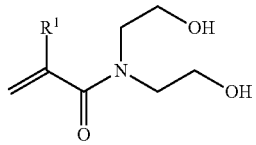

N,N-bis(2-hydroxyethyl)acrylamide,

-continued

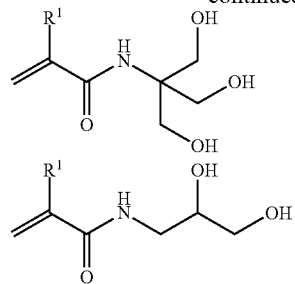

And mixtures thereof.

19. The device of claim 1 wherein said N-(2-hydroxyalky)(meth)acrylamide is selected from the group consisting of N-(2-hydroxypropyl)(meth)acrylamide, and N,N-bis(2-hydroxyethyl)acrylamide.

20. The device of claim 1 wherein said N-(2-hydroxyalky)(meth)acrylamide comprises N-(2-hydroxypropyl) methacrylamide.

21. The device of claim 1 wherein said crosslinked polymer matrix comprises hydrogen bond accepting groups.

22. The device of claim 21 wherein said hydrogen bond accepting groups are selected from groups consisting of amide groups, amine groups, ethers, fluorines and combinations thereof.

23. The device of claim 21 wherein said hydrogen bond accepting groups are selected from the group consisting of pyrrolidone groups, amide groups, and combinations thereof.

24. The device of claim 1 wherein said polymer matrix comprises a silicone hydrogel.

25. The device of claim 1 wherein said device is an ophthalmic device.

26. The device of claim 25 wherein said ophthalmic device is selected from the group consisting of contact lenses, intraocular lenses, punctal plugs and ocular inserts.

* * * * *